(12) United States Patent
Takeshita

(10) Patent No.: US 7,272,083 B2
(45) Date of Patent: *Sep. 18, 2007

(54) OPTICAL HEAD DEVICE AND METHOD FOR CORRECTING SPHERICAL ABERRATION

(75) Inventor: Nobuo Takeshita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 544 days.

This patent is subject to a terminal disclaimer.

(21) Appl. No.: 09/984,131

(22) Filed: Oct. 29, 2001

(65) Prior Publication Data

US 2002/0089904 A1 Jul. 11, 2002

(30) Foreign Application Priority Data

Nov. 30, 2000 (JP) .............................. 2000-364646

(51) Int. Cl.
*G11B 7/085* (2006.01)
*G02F 1/29* (2006.01)

(52) U.S. Cl. .................................................. 369/44.23
(58) Field of Classification Search .............. 369/44.23
See application file for complete search history.

(56) References Cited

U.S. PATENT DOCUMENTS

| 4,797,545 | A |   | 1/1989 | Shikama et al. |            |
|-----------|---|---|--------|----------------|------------|
| 4,865,445 | A | * | 9/1989 | Kuriyama et al. | ............ 356/73 |
| 5,532,987 | A | * | 7/1996 | Fujita et al. | ............ 369/44.24 |
| 5,768,244 | A | * | 6/1998 | Choi           | ............ 369/112.21 |
| 5,864,525 | A | * | 1/1999 | Takeshita et al. | ........ 369/44.23 |
| 6,181,666 | B1 | * | 1/2001 | Miyazaki et al. | ...... 369/112.01 |
| 6,353,582 | B1 | * | 3/2002 | Kikuchi        | ................... 369/44.23 |
| 6,418,108 | B1 | * | 7/2002 | Ueda et al.    | ............. 369/112.23 |
| 6,574,174 | B1 | * | 6/2003 | Amble et al.   | ............ 369/44.26 |
| 6,938,890 | B2 | * | 9/2005 | Yoo et al.     | .............. 369/112.26 |

FOREIGN PATENT DOCUMENTS

JP   A2000-011402   1/2000

OTHER PUBLICATIONS

Optical Disk Technique (Radio Gijutsusha) pp. 60-62.

* cited by examiner

*Primary Examiner*—Gautam R. Patel
(74) *Attorney, Agent, or Firm*—Birch, Stewart, Kolasch, & Birch, LLP

(57) ABSTRACT

On an optical disk in a recording and/or playback apparatus, the position at which the thickness error of a light transmission layer is in the optical axis of an objective lens 11, and the position at which the recording/playback of information is performed is in the optical axis of a two-group objective lens 20, so that they are spaced apart from each other, making it impossible to accurately detect the thickness error at the position where the recording/playback of information is performed. Further, to chronologically compensate for the space between them, an excess circuit is required. In view of this, a first reflection light 107*a* reflected by a medium surface 106*a* of the optical disk is received to detect the focal error with respect to the medium surface, and a second reflection light 107*b* reflected by the surface of a light transmission layer 106*b* formed on the medium surface 106*a* to detect the focal error with respect to the surface of the light transmission layer 106*b*. And, in correspondence with the focal error with respect to the surface of the light transmission layer 106*a*, the collimator lens 103 is moved.

17 Claims, 10 Drawing Sheets

140a
140b
140

141a
141b
142a
142b
141

EXAMPLE OF OPTICAL HEAD CONSTRUCTION (PRIOR ART)

OPTICAL HEAD DEVICE AND METHOD FOR CORRECTING SPHERICAL ABERRATION

BACKGROUND OF THE INVENTION

1. Field of the Invention

The present invention relates to an optical head device, a recording and/or playback apparatus and a recording and/or playback method in which a thickness error of the light transmission layer of an information recording medium for performing recording or reproduction of information is detected to correct spherical aberration generated due to the error.

2. Description of the Related Art

In an optical head device used in a recording and/or playback apparatus, there is a great demand for increasing the numerical aperture (NA) of the objective lens to record information with higher density. When the numerical aperture is increased, it becomes possible to reduce the diameter of the condensing spot. At the same time, however, the error degree allowed for the system decreases. More specifically, the permissible error degree regarding the thickness of the light transmission layer of the information recording medium, the permissible error degree regarding the inclination of the information recording medium with respect to the objective lens, decrease. Here, the spherical aberration, which is predominant in an optical system in which the NA is large (e.g., 0.85), will be explained.

As stated in "Optical Disk Technique" (published by Radio Gijutsusha), pp. 60 to 62, the spherical aberration $W40d$ generated due to the thickness error $\Delta d$ of the light transmission layer can be expressed by equation (1), using the refractive index n of the light transmission layer material and the numerical aperture NA of the objective lens.

$$W40d = (n^2-1)/(8 \times n^3) \times (NA)^4 \times \Delta d \quad (1)$$

For example, as can be seen from equation (2), an optical system using an objective lens having an NA of 0.85 has to be approximately four times as accurate as an optical system using an objective lens of an NA of 0.6 such as DVD in terms of the thickness error of the light transmission layer.

$$W40d(0.85)/W40d(0.6) = (0.85/0.6)^4 \quad (2)$$
$$= 4.02$$

As can be seen from the above, detecting the thickness error of the light transmission layer and performing some sort of correction on the spherical aberration is an effective means of realizing high-density recording/playback. In this regard, there has been proposed an optical head device which has a first optical system for detecting the thickness error of the light transmission layer of an information recording medium and a second optical system for performing recording/playback of information and in which the position of an optical element in the second optical system is adjusted so as to correct the thickness error detected by the first optical system.

FIG. 14 shows a conventional optical head, which is disclosed in Japanese Unexamined Patent Application Publication No. 2000-11402. In the drawing, numeral 1 indicates an optical head, numeral 2 indicates an optical disk, numeral 3 indicates a substrate, numeral 4 indicates a light transmission layer, numeral 5 indicates a first optical system, and numeral 6 indicates a second optical system. Numeral 7 indicates a light source, numeral 8 indicates a beam splitter, numeral 9 indicates a collimator lens consisting of two spherical lenses 9a and 9b glued to each other, numeral 10 indicates a hologram element, numeral 11 indicates an objective lens, and numeral 12 indicates a photo detector having a first light receiving portion 12a and a second light receiving portion 12b. Numeral 13 indicates a light source, numeral 14 indicates a cylindrical lens, numeral 15 indicates a polarization beam splitter, numeral 16 indicates a collimator lens consisting of two spherical lenses 16a and 16b glued to each other, numeral 17 indicates a diffraction grating, numeral 18 indicates a boot-up mirror, numeral 19 indicates a ¼ wavelength plate, numeral 20 indicates a 2-group objective lens consisting of two spherical lenses 20a and 20b glued to each other, numeral 21 indicates a photo detector, numeral 22 indicates an actuator, numeral 23 indicates a condensing lens, numeral 24 indicates an output detection photo detector, and numeral 30 indicates a 2-axis actuator.

In the above construction, the laser beam emitted from the light source 7 is reflected by the beam splitter 8, converted to parallel rays by the collimator lens 9, diffracted by the hologram element 10 and separated into 0-order light and first-order light having different focal positions. Then, the 0-order light and the first-order light are condensed on the optical disk 2 by the objective lens 11. The focus of the 0-order light differs from that of the first-order light by a length substantially equal to the thickness of the light transmission layer 4, so that the 0-order light is transmitted through the light transmission layer 4 and condensed on the recording layer to form a spot, the first-order light being condensed on the surface of the light transmission layer 4 to form a spot.

Next, the 0-order light and the first-order light reflected by the optical disk 2 travel by way of the former optical path and are transmitted through the objective lens 11 before they are converted to convergent light by the collimator lens 9, impinging upon the first light receiving portion 12a and the second light receiving portion 12b on the photo detector 12. First, the first light receiving portion 12a detects a focus error signal due to the return light from the recording layer of the optical disk 2, and the second light receiving portion 12b detects a focus error signal due to the return light from the surface of the light transmission layer 4 of the optical disk 2. Astigmatism is imparted to these return lights by the beam splitter 8 arranged in the convergent light, and the focus error signals are detected by means of the well-known astigmatism method.

On the other hand, in the second optical system 6, the laser beam emitted from the light source 13 is beam-shaped by the cylindrical lens 14, and is then transmitted through the polarization beam splitter 15 before it impinges upon the collimator lens 16. The laser beam output from the collimator lens 16 impinges upon the diffraction grating 17, is diffracted into 3 beams. Then, the proceeding direction is bent by the boot-up mirror 18 before the beam impinges upon the ¼ wavelength plate 19. The laser beam output from the ¼ wavelength plate 19 impinges upon the 2-group objective lens 20, and is condensed on the recording layer of the optical disk 2. The return light reflected by the recording layer travels by way of the former optical path and is turned into convergent light by the collimator lens 16 before it is reflected by the polarization beam splitter 15 and impinges upon the photo detector 21 with the result that a signal is detected.

Numeral 22 indicates an actuator. By moving the collimator lens 16 in the optical axis direction of the laser beam based on the focus error signal detected by the second light receiving portion 12b in the first optical system 5, it reduces the spherical aberration of the light spot condensed on the medium surface of the optical disk 2. In the condition in which the light source 13 is arranged at the focal position of the collimator lens 16, parallel rays are output from the collimator lens 16, and impinge upon the 2-group objective lens 20, so that no spherical aberration is generated.

However, when the collimator lens 16 is moved in the optical axis direction of the laser beam, the laser beam transmitted through the collimator lens 16 ceases to parallel rays, and the light impinges upon the 2-group objective lens 20, with the result that spherical aberration is generated. Utilizing this nature, the amount and polarity of the spherical aberration generated in the light spot condensed on the medium surface of the optical disk 2 are detected, and the distance between thee light source 13 and the collimator lens 16 is varied so that a spherical aberration of the opposite polarity may be generated. The condensing lens 23 condenses the laser beam reflected by the polarization beam splitter 15 on an output adjusting photo detector 24. On the basis of the light reception amount of the output adjusting photo detector 24, the output of the laser beam from the light source 13 is automatically adjusted. Numeral 30 indicates a 2-axis actuator having a movable portion on which the objective lens 11 and the 2-group objective lens 20 are mounted, focusing control and tracking control of the objective lens 11 and the 2-group objective lens 20 being performed.

In the above-described optical head device, the optical system (first optical system 5) for detecting the thickness error of the light transmission layer and the optical system (second optical system 6) for performing the recording/playback of information are separately provided, resulting in a complicated construction, an increase in production cost and a large apparatus size.

Further, on the optical disk, the position where the thickness error of the light transmission layer is detected is in the optical axis of the objective lens 11, and the position where the recording/playback of information is performed is in the optical axis of the 2-group objective lens 20, which means they are spaced apart from each other, and the detection of the thickness error at the position where the recording/playback of information is performed cannot be effected accurately. The distance might be chronologically compensated for. However, that would involve provision of an excess circuit.

SUMMARY OF THE INVENTION

The present invention has been made with a view toward solving the above problems. Accordingly, it is an object of the present invention to provide a simple and small optical head device, a recording and/or playback apparatus and a recording and/or playback method in which the spherical aberration of the condensing spot is corrected by detecting the thickness error of the light transmission layer, making it possible to accurately perform the recording/playback of information.

In accordance with this invention, there is provided an optical head device comprising a first objective lens which condenses parallel rays on a medium surface of an information recording medium and which puts together a first reflection light obtained by reflecting the condensed light at the medium surface and a second reflection light obtained by reflecting the condensed light at the surface of a light transmission layer formed on the medium surface, a converging lens for converging the first reflection light and the second reflection light put together, a first detection means for receiving the first reflection light converged to detect the focal error with respect to the medium surface, a second detection means for receiving the second reflection light converged to detect the focal error with respect to the surface of the light transmission layer, and a moving means for moving the collimator lens in correspondence with the detection by the second detection means.

Further, in accordance with the present invention, there is provided a recording and/or playback apparatus comprising a light source, a collimator lens for converting light emitted from the light source into parallel rays, an optical head device comprising a first objective lens which condenses the parallel rays on a medium surface of an information recording medium and which puts together a first reflection light obtained by reflecting the condensed light at the medium surface and a second reflection light obtained by reflecting the condensed light at the surface of a light transmission layer formed on the medium surface, a converging lens for converging the first reflection light and the second reflection light put together, a first detection means for receiving the first reflection light converged to detect the focal error with respect to the medium surface, a second detection means for receiving the second reflection light converged to detect the focal error with respect to the surface of the light transmission layer, and a moving means for moving the collimator lens in correspondence with the detection by the second detection means, a first control means for detecting the focal error of the medium surface by the detection of the first detection means to control the position of the objective lens, and a second control means for detecting the focal error with respect to the surface of the light transmission layer and controlling the moving means to correct the spherical aberration by the collimator lens.

Further, in accordance with the present invention, there is provided a recording and/or playback method comprising a first detection step for detecting the focal error of a first reflection light, a step for moving an objective lens so as to correct the focal error of the first reflection light, a second detection step for detecting the focal error of a second reflection light, and a step for moving a collimator lens by a moving means so as to correct spherical aberration in correspondence with the output of the second detection step.

DETAILED DESCRIPTION OF THE PREFERRED EMBODIMENTS

Embodiments of the present invention will now be specifically described with reference to the drawings.

Figure 1:
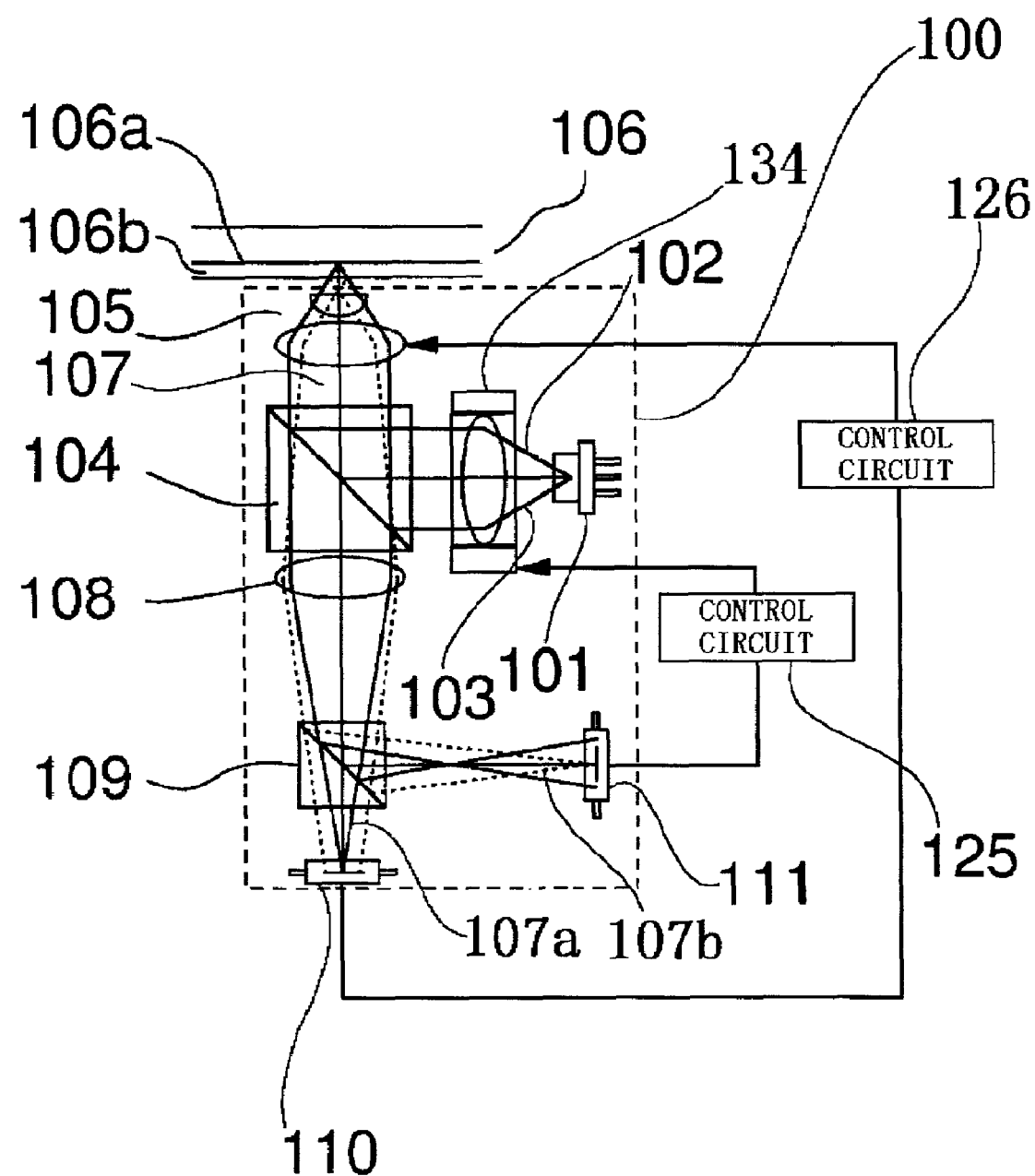
FIG. 1 is a schematic diagram showing an optical head device of a recording and/or playback apparatus according to a first embodiment of the present invention and the peripheral construction thereof.

FIG. 1 is a schematic diagram showing an optical head device of a recording and/or playback apparatus according to a first embodiment of the present invention and the peripheral construction thereof. In the drawing, numeral 100 indicates an optical head device, numeral 101 indicates a semiconductor laser serving as a light source, numeral 102 indicates a laser beam emitted from the semiconductor laser 101, numeral 103 indicates a collimator lens for converting the laser beam 102 into parallel rays, numeral 104 indicates a prism, numeral 106 indicates an information recording medium containing a medium surface 106*a* and a light from the information recording medium 106 transmission layer 106*b* for protecting the medium surface 106*a* and allowing the laser beam 102 to be transmitted therethrough, numeral 107 indicates reflection light consisting of reflection light 107*a* which is a fist reflection light reflected by the medium surface 106*a* and reflection light 107*b* which is a second reflection light reflected by the medium surface 106*b*, numeral 105 indicates a first objective lens which condenses the laser beam 102 turned into parallel rays on the medium surface 106*a* and which consists of two groups of lenses for collecting the reflection light 107*a* and the reflection light 107*b*, numeral 108 indicates a convergent lens for converging the reflection light 107, numeral 109 indicates a division prism which is a division means for dividing the converged reflection light 107, numeral 110 indicates a sensor photo detector which is a first detection means for receiving the reflection light 107*a*, numeral 111 indicates a photo detector which is a second detection means for receiving the reflection light 107*b* to detecting the thickness error of the light transmission layer 106*a*, and numeral 134 indicates a moving means for moving the collimator lens 103 in correspondence with the detection from the photo detector 111.

Further, numeral 126 indicates a first control circuit for detecting the focal error of the objective lens 105 with respect to the medium surface 106*a* from the sensor photo detector 110 to perform positional control of the objective lens 105, and numeral 125 indicates a second control circuit for detecting the focal error with respect to the surface of the light transmission layer 106 and controlling the moving means 134 to correct the spherical aberration by the collimator lens 103. As the tracking method, the DPD method (phase difference method) which is generally used in DVD players or the like.

Figure 2:
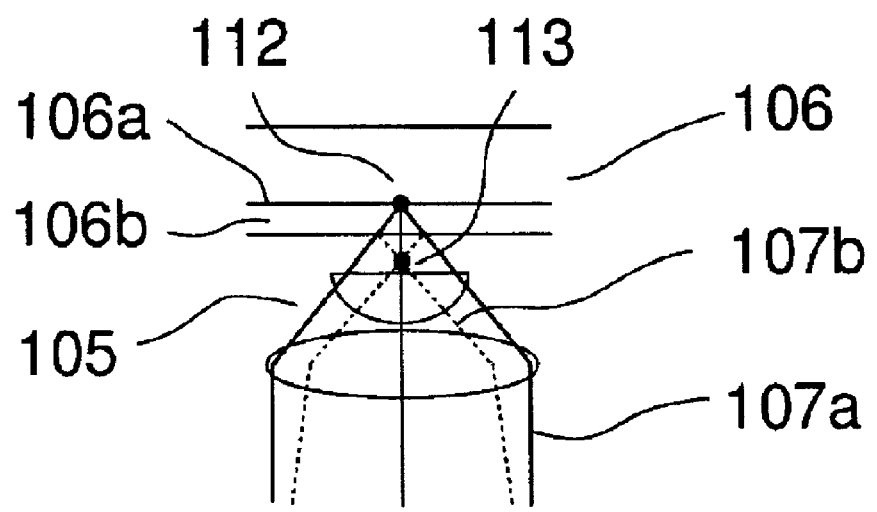
FIG. 2 is an enlarged view showing how light is condensed from an objective lens of the first embodiment of the present invention onto an information recording medium.

FIG. 2 is an enlarged view showing how light is condensed from the objective lens 105 of this embodiment onto the information recording medium 106. In the drawing, numeral 112 indicates a first condensing spot at which light is condensed on the medium surface 106*a*, and numeral 113 indicates a second condensing spot at which the laser beam 102 reflected by the light transmission layer 106*b* is condensed.

Next, the operation of this embodiment will be described. The laser beam 102 emitted from the semiconductor laser 101 is converted from divergent light into substantially parallel rays by the collimator lens 103, and impinges upon the prism 104. The laser beam 102 is reflected by the prism 104 so as to be directed toward the objective lens 105, and is condensed on the information recording medium 106 by the objective lens 105. Of the laser beam 102, a portion of light is condensed on the medium surface 106*a* as the first condensing spot 112, and another portion of light is reflected by the surface of the light transmission layer 106*b* and condensed on the external portion of the information recording medium 106 as the condensing spot 113.

In the first detection process, the reflection light 107*a* travels reversely along the above-mentioned optical path and is transmitted through the prism 104 before it is converted from parallel rays into convergent light by the converging lens 108, travels by way of the division prism 109 and is received by the sensor photo detector 110 and the optical photo detector 111 for detecting the thickness error of the light transmission layer. The sensor photo detector 110 outputs a focal error signal of the first condensing spot 112 with respect to the medium surface 106*a*, a tracking error signal, a playback signal, etc. The focal error signal, the tracking error signal, etc. are input to the control circuit (not shown), performing the process for moving the objective lens 105.

On the other hand, in the second detection process, the reflection light 107*b* is transmitted through the prism 104 in the same way as the above reflection light 107*a*, and then travel by way of the division prism 109 before it is received by the sensor photo detector 110 and the photo detector 111 for detecting the thickness error of the light transmission layer. The photo detector 111 for detecting the thickness error of the light transmission layer can detect the focal error signal by the reflection light 107*b*. However, since the condensing spot 112 is constantly controlled so as to be condensed on the medium surface 106*a*, the thickness error of the light transmission layer is output as a result. In correspondence with the output of the second detection process, the process of moving the collimator lens 103 so as to correct the spherical aberration in correspondence with the output of the second detection process is performed.

Figure 3:
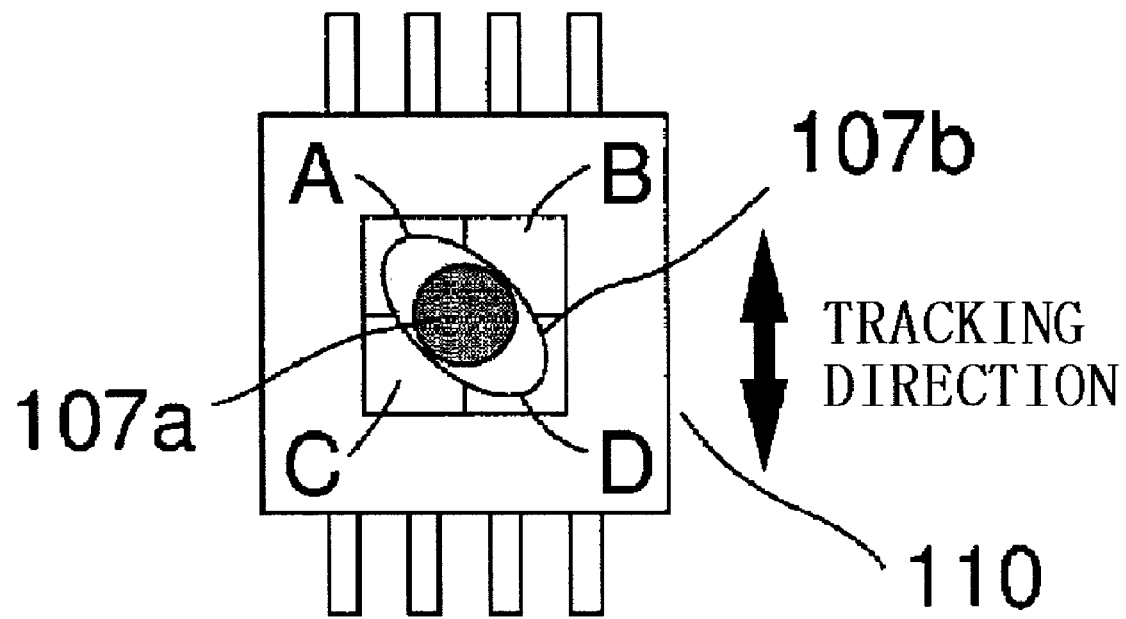
FIG. 3 is a diagram showing the convergent light pattern on a sensor photo detector and the waveform of a focus error signal when there is a change in the positional relationship between the information recording medium and the optical head device.
Figure 4:
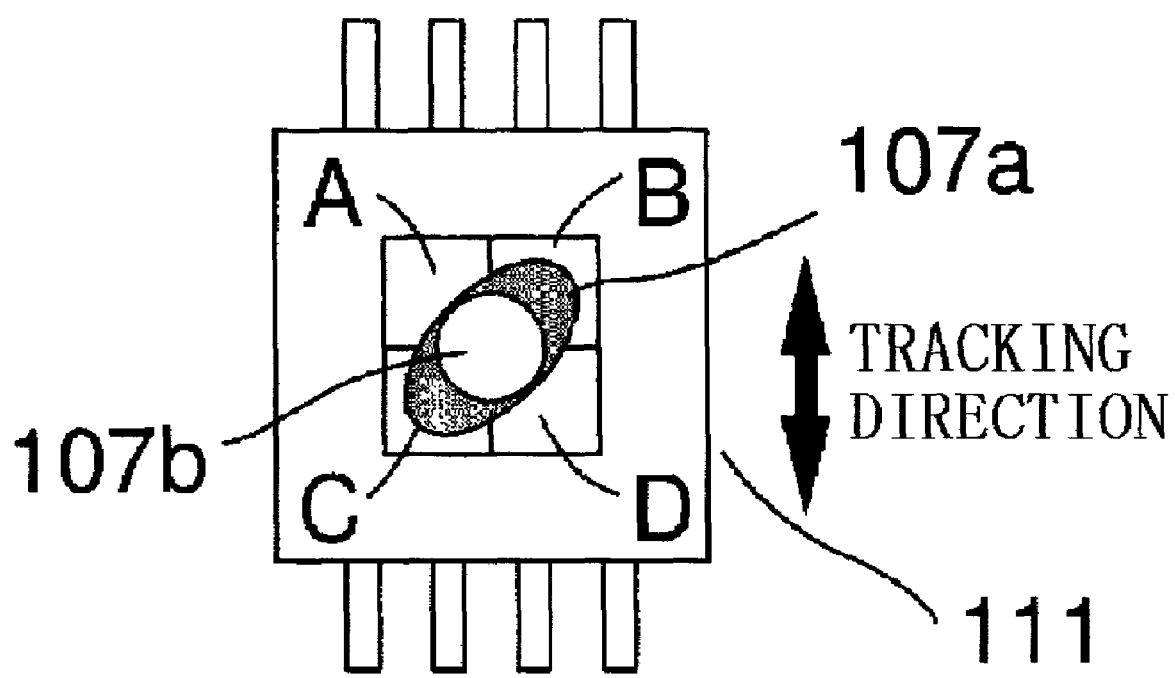
FIG. 4 is a diagram showing the convergent light pattern on a photo detector and the waveform of a focus error signal when there is a change in the positional relationship between the information recording medium and the optical head device.

FIG. 3 is a diagram showing the construction of the sensor photo detector 110 in FIG. 1, and FIG. 4 is a diagram showing the construction of the photo detector 111 in FIG.

1. In the drawings, assuming that the four receiving portions are referred to as A through D and that the direction of the arrow is the tracking direction, the focal error signal is obtained as the differential computation output: (A+D)−(B+C) by the well-known spherical aberration method. The focal error signal, which is the output of this sensor photo detector 110, is used for the focal control of the objective lens 105, and the focal error signal output from the photo detector 111 for detecting the thickness error of the light transmission layer is used for the positional control of the collimator lens 103. Further, the tracking error signal is obtained as the phase difference computation output: (A+D)−(B+C) from the sensor photo detector 110 by the well-known DPD method.

Figure 5:
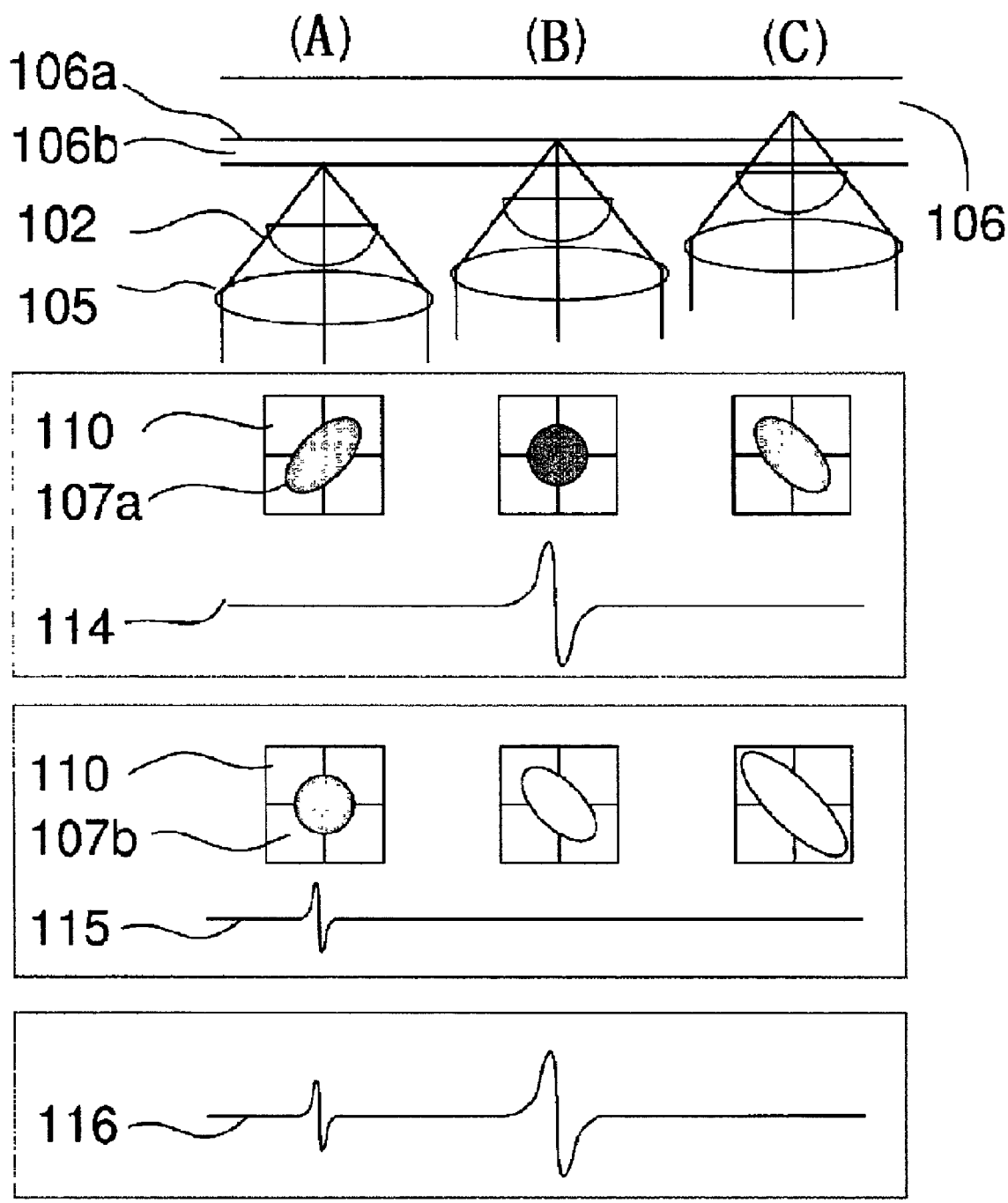
FIG. 5 is a diagram showing the construction of the sensor photo detector in the first embodiment.

FIG. 5 is a diagram showing the convergent light pattern on the sensor photo detector and the waveform of the focal error signal when there is a change in the positional relationship between the information recording medium 106 and the optical head device 100. In the drawing, numeral 114 indicates a focal error signal obtained from the reflection light 107a by the sensor photo detector 110, numeral 115 indicates a focal error signal obtained from the reflection light 107b by the sensor photo detector 110, and numeral 116 indicates a focal error signal output consisting of the focal error signal 114 and the focal error signal 115 added together and output from the sensor photo detector 110 due to the simultaneous application of the reflection light 107a and the reflection light 107b to the sensor photo detector 110. In each of the focal error signals 114 through 116, the horizontal axis indicates the position of the objective lens 105 in the optical axis direction, and the vertical axis indicates the amplitude of each signal.

Here, the reflection light 107b is also applied to the sensor photo detector 110. However, the sensor photo detector 110 is arranged at a position spaced apart from the condensing position of the unnecessary reflection light 107b, so that although unnecessary light with a large diameter is applied, there is no great influence on the focal error signal.

Further, the horizontal axis of the focal error signal 114, the focal error signal 115 and the focal error signal 116 indicates the position in the focal direction of the condensing spot, and the vertical axis thereof indicates the output amplitude of the error signal at their respective positions. (A) through (C) shown in the upper portion of the drawing indicate the positions in the focal direction with respect to the information recording medium 106. (A) shows the condition in which the laser beam 102 is condensed on the surface of the light transmission layer 106b, (B), in the middle, shows the condition in which the laser beam 102 is condensed on the medium surface 106a, and (C), at the right-hand end, shows the condition in which the reflection light 107a from the medium surface 106a is condensed on the photo detector 111 for detecting the thickness error of the light transmission layer. Of these drawings, (B) shows the condition in which driving control is being actually performed.

As shown in the drawings, the reflection light 107a is substantially circular in the condition (B) and the error signal appears on the focal error signal 114, and the reflection light 107b on the sensor photo detector 110 is substantially circular in the condition (A), and the error signal appears on the focal error signal 115. The focal error signal 116, which is an addition output of the focal error signal 114 and the focal error signal 115, exhibits a waveform having two S-shaped curves. The sensor photo detector 110 is arranged at a position at which the intensity distribution on the sensor photo detector 110 of the reflection light 107a is substantially circular when it is in the condition (B), so that the focal error signal 114 exhibits a large S-shaped curve near the condition of (B). When in the conditions (A) and (C), the intensity distribution of the reflection light 107a on the sensor photo detector 110 is blurred and widespread, and the focal error signal 114 is of a value close to zero.

On the other hand, regarding the reflection light 107b, the intensity distribution of the reflection light 107b on the sensor photo detector 110 is substantially circular when in the condition (A), so that the focal error signal 115 exhibits a small S-shaped curve near the condition (A). Further, when in the conditions (B) and (C), the intensity distribution of the reflection light 107b on the sensor photo detector 110 is blurred and widespread, and the focal error signal 114 is of a value close to zero. The difference in the size of the S-shaped curve comes from the difference in reflectivity between the medium surface 106a and the light transmission layer 106b. Since the reflectivity of the medium surface 106a is greater than that of the light transmission layer, the larger S-shaped curve is to be observed.

Figure 6:
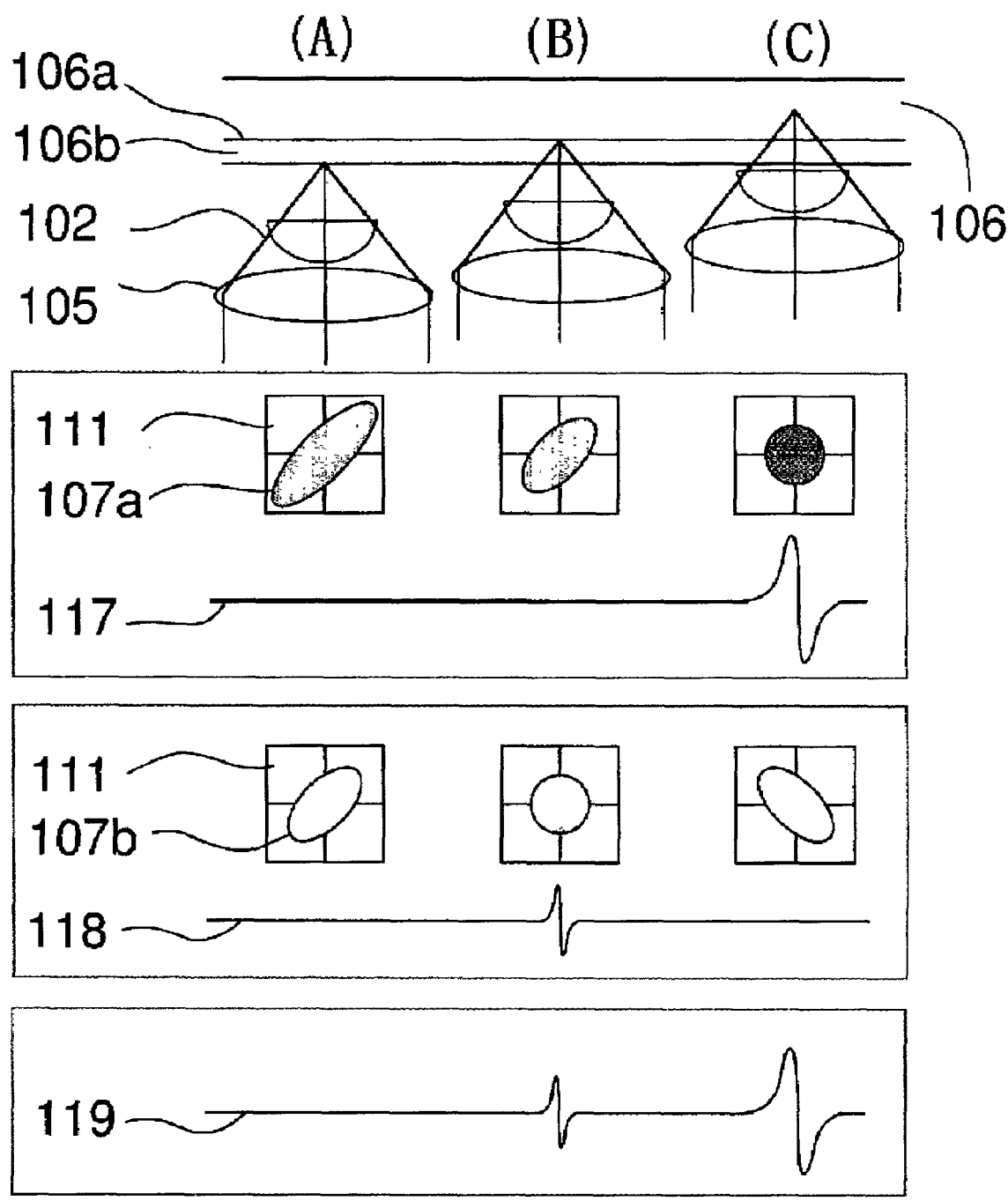
FIG. 6 is a diagram showing the construction of the photo detector in the first embodiment.

FIG. 6 is a diagram showing the convergent light pattern on the photo detector 111 and the waveform of the focal error signal when there is a change in the positional relationship between the information recording medium 106 and the optical head device 100. In the drawing, numeral 117 indicates a focal error signal obtained from the reflection light 107a by the photo detector 111 for detecting the thickness error of the light transmission layer, and numeral 118 indicates a focal error signal obtained from the reflection light 107b by the photo detector 111 for detecting the thickness error of the light transmission layer. In the focal error signals 117 through 119, the horizontal axis indicates the position in the optical axis direction of the objective lens 105, and the vertical axis indicates the amplitude of each signal.

Regarding the reflection light 107a, the intensity distribution on the photo detector 111 due to the reflection light 107a is substantially circular in the condition (C), so that an error signal appears on the focal error signal 117 near the condition (C), with the large S-shaped curve being exhibited. When in the conditions (A) and (B), the intensity distribution of the reflection light 107a on the photo detector 111 for detecting the thickness error of the light transmission layer is blurred and widespread, and the focal error signal 117 is of a value close to zero. On the other hand, regarding the reflection light 107b, it is substantially circular in the condition (B), an error signal appears on the focal error signal 118. Further, when in the conditions (A) and (B), the intensity distribution of the reflection light 107b on the photo detector 111 for detecting the thickness error of the light transmission layer is blurred and widespread, and the focal error signal 118 is of a value close to zero.

Here, the reflection light 107a and the reflection light 107b are also simultaneously applied to the photo detector 111, the output from the photo detector 111 for detecting the thickness error of the light transmission layer is the sum total of the two reflection lights, and the signal 119 is a focal error signal obtained adding together the focal error signal 117 and the focal error signal 118, exhibiting two S-shaped curves. The photo detector 111 is arranged at a position at which the intensity distribution of the reflection light 107b on the photo detector 111 is substantially circular when in the condition (B), and the focal error signal 118 exhibits a small S-shaped curved near the condition (B). The difference in the size of the S-shaped curve comes from the fact that reflectivity at the medium surface 106a is greater than that of at the light transmission layer 106b.

The reflection light 107a reflected by the medium surface 106a is also applied to the photo detector 111 for detecting the thickness error of the light transmission layer 106b. However, since the photo detector 111 is arranged at a position spaced apart from the condensing position for the unnecessary reflection light 107a, there is no great influence on the focal error signal although a uniform unnecessary light with a great diameter is applied.

After being transmitted through the prism 104 like the above reflection light 107a, the reflection light 107b travels by way of the division prism 109 and is received by the sensor photo detector 110 and the photo detector 111 for detecting the thickness error of the light transmission layer. The photo detector 111 for detecting the thickness error of the light transmission layer can detect the focal error signal from the reflection light 107b. However, since the condensing spot 112 is constantly controlled so that light is condensed on the medium surface 106a, the thickness error of the light transmission layer 106b is output.

The above relationship is the same in the case of the photo detector 111, the focal error signal 117, the focal error signal 118 and the focal error signal 119. However, the focal control of the objective lens 105 is performed on the basis of the output of the sensor photo detector 110, and the output of the photo detector 111 for detecting the thickness error of the light transmission layer is not used. Further, as shown in FIG. 6, from the photo detector 111 for detecting the thickness error of the light transmission layer, in the condition (B), the focal error signal of the reflection light 107b is output. This represents the distance error of the surface position of the light transmission layer 106b and the medium surface 106a, that is, the thickness error of the light transmission layer.

In view of this, the sensor photo detector 110 is positioned at a position where the focal error signal of the medium surface 106a can be detected upon reception of the reflection light 107a with the laser beam 102 being condensed on the medium surface 106a. Further, the photo detector 111 for detecting the thickness error of the light transmission layer is arranged at a position where the thickness error signal of the light transmission layer 106a can be detected upon reception of the reflection light 107b from the light transmission layer 106b with the laser beam 102 being condensed on the medium surface 106a. Thus, even when the kind of information recording medium 106 differs and the preset value of the thickness of the light transmission layer differs, it can be coped with by changing the positions of the sensor photo detector 110 and the photo detector 111.

Further, they are arranged at positions where both error signals are zero when the thickness of the light transmission layer 106b is the preset value, the sensor photo detector 110 and the photo detector 111 for detecting the thickness error of the light transmission layer receiving the reflection light 107a and the reflection light 107b and outputting the optical information as electrical information. The sensor photo detector 110 outputs the reproduction signal as the sum signal of the light receiving portion divided into four, and outputs the focal error signal and the tracking error signal from the differential computation output.

Thus, the optical system for controlling the thickness of the light transmission layer and the optical system for performing recording and/or playback are formed by a single optical path, making it possible to achieve an improvement in terms of assembly accuracy due to a reduction in the number of component parts and an achievement in terms of good item ratio.

As shown in FIGS. 5 and 6, as the positional relationship of the information recording medium 106 and the objective lens 105 varies in the focal direction, the configuration of the condensing spots on the sensor photo detector 110 and the photo detector 111 for detecting the thickness error of the light transmission layer varies. In the optical head device 100 of the present embodiment, as the focal error detection method and the tracking error detection method, the astigmatism method and the DPD method (phase difference detection method) generally used in CD players and DVD players are used. In the astigmatism method, as shown in FIG. 5, when focal deviation is generated, the configuration of the condensing spot on the photo detector is an elliptical configuration extending in 45-degree direction, and an output corresponding to the configuration is output as the focal error from the sensor photo detector.

On the other hand, when track deviation occurs, bias is generated in the intensity distribution of the condensing spot 107a, and an output corresponding to the bias is output from the sensor photo detector 110 as the tracking error. The focal error signal 116 and the tracking error signal obtained from the sensor photo detector 110 are utilized for the purpose of performing positional control on the objective lens 105, and the objective lens 105, which is composed of two groups of lenses, is integrally position-controlled by the first control circuit 126. Further, the light transmission layer thickness signal 119 obtained from the photo detector 111 is utilized for the purpose of performing positional control of the collimator lens 103.

Further, the reflection light 107b is not transmitted through the light transmission layer yet, so that it exhibits spherical aberration as the condensing spot 113. However, as can be observed in an optical head device generally used, although the reflection light 107 reflected by the surface of the light transmission layer 106b exhibits a large spherical aberration, it is possible to detect the focal error signal on the surface of the light transmission layer 106b.

Figure 7:
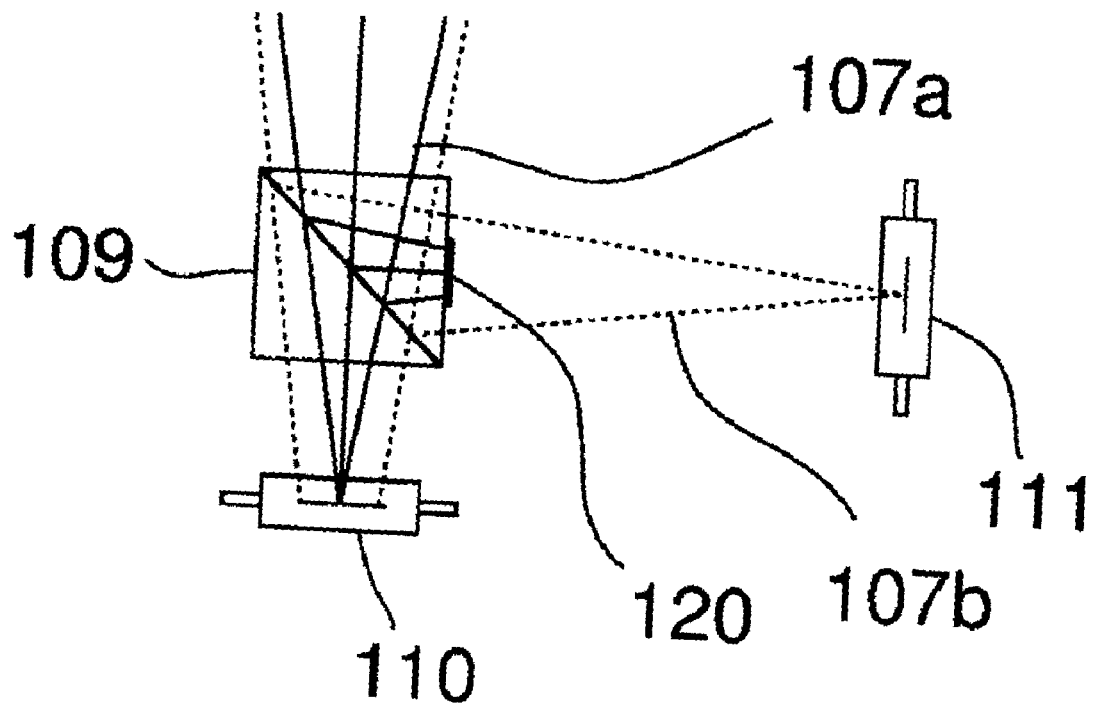
FIG. 7 is an enlarged optical path diagram showing a construction in which an optical filter for cutting off unnecessary light is provided between beam dividing means and the photo detector.

FIG. 7 is an enlarged optical path diagram showing a construction in which an optical filter for cutting off unnecessary light is provided between the beam splitting means in FIG. 1 and the photo detector. In the drawing, numeral 120 indicates an optical filter arranged between the division prism 109 and the photo detector 111 for detecting the thickness error of the light transmission layer. The optical filter 120 cuts off the reflection light 107a reflected by the division prism 109 and is transmitted through the outer peripheral portion of the reflection light 107b, and reduces the reflection light 107a received as the unnecessary light by the photo detector 111, making it possible to mitigate the adverse influence on the light transmission layer thickness error signal 119.

Figure 8:
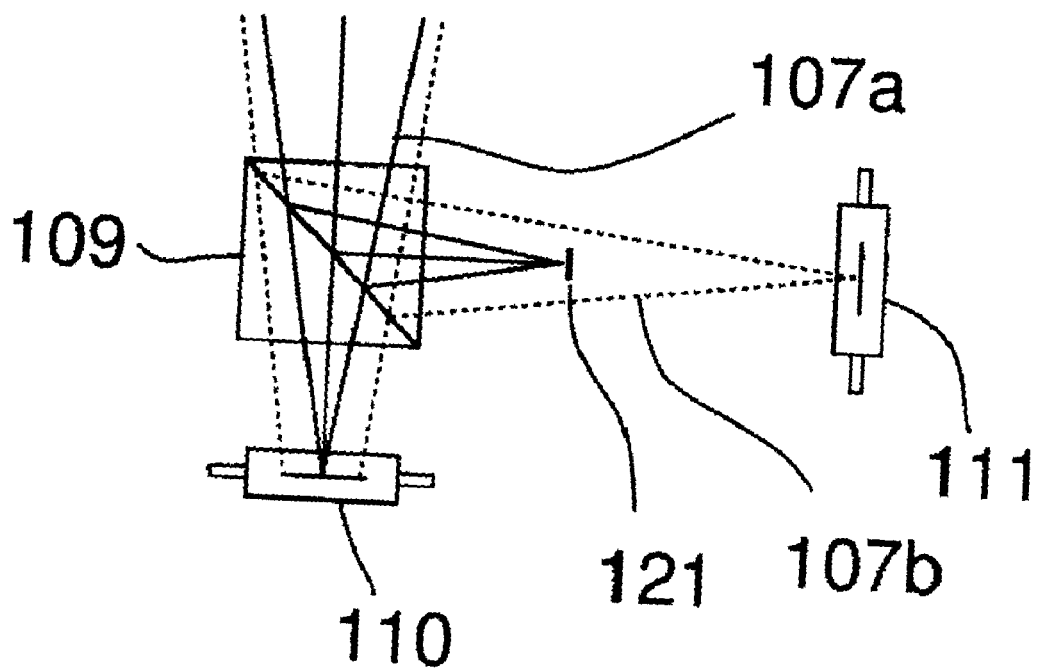
FIG. 8 is an enlarged optical path diagram showing a construction in which an optical filter for cutting off unnecessary light is provided between beam dividing means and the photo detector.

In FIG. 8, numeral 121 indicates an optical filter arranged between the division prism 109 and the photo detector 111 for detecting the thickness error of the light transmission layer and in the vicinity of the focus of the reflection light 107a. Thus, it is possible to restrain the cutting off of the light reception quantity of the reflection light 107b and to reduce the quantity of the reflection light 107a received by the photo detector 111, so that it is possible to mitigate the adverse influence on the light transmission layer thickness error signal.

Figure 9:
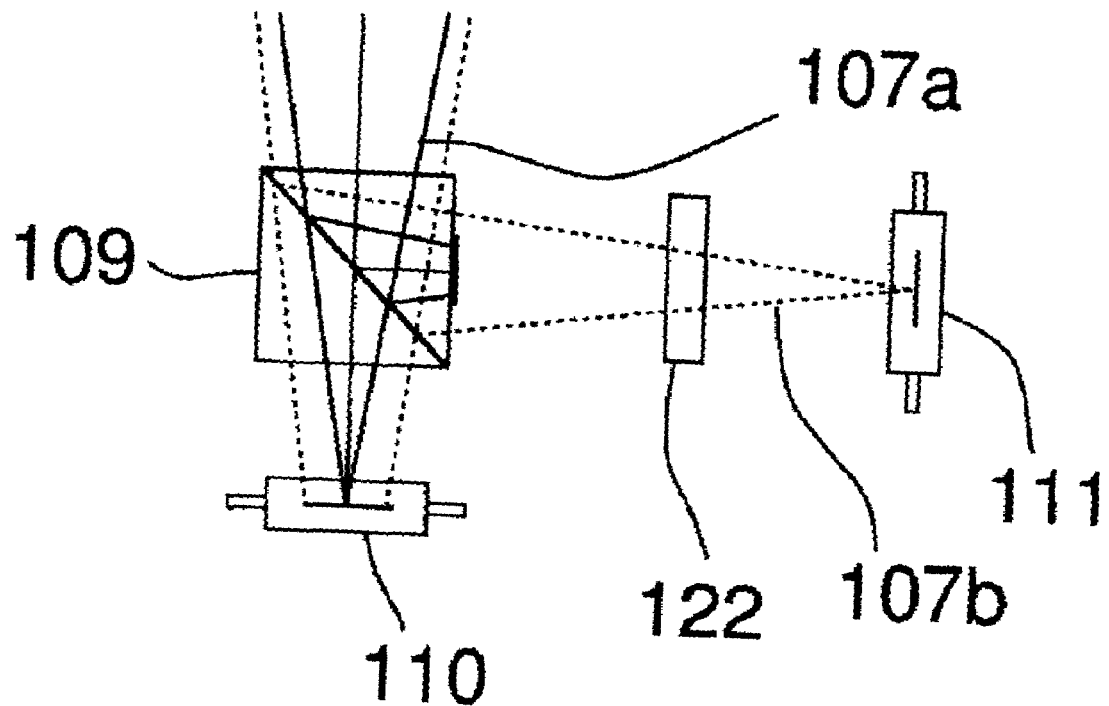
FIG. 9 is an enlarged optical path diagram showing a construction in which a spherical aberration correcting element is provided between beam dividing means and the photo detector.

FIG. 9 is an enlarged optical path diagram showing a construction in which there is provided between the beam dividing means 109 of FIG. 1 and the photo detector 111 an optical element for imparting spherical aberration. There is provided in the optical path of convergent light an optical element 122 consisting of a parallel flat plate, and spherical aberration is corrected in the condition of the condensing spot 113, achieving an improvement in terms of the accuracy of the error signal detected by the photo detector 111.

Figure 10:
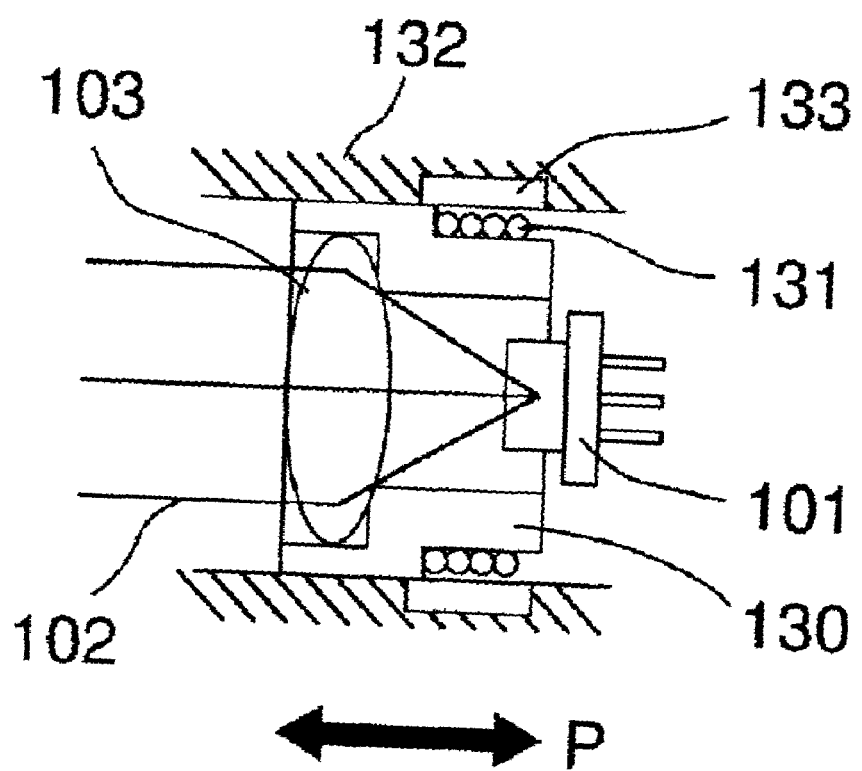
FIG. 10 is a schematic sectional view of a moving means for moving a collimator lens in the optical axis direction.

FIG. 10 is a schematic sectional view of a linear actuator, which is a moving means 134 for performing positional adjustment on the collimator lens. In the drawing, numeral 130 indicates a lens holder for holding the collimator lens 103, numeral 131 indicates a coil wound around the lens holder 130, numeral 132 is a holder guide for supporting the lens holder so as to be movable in the optical axis direction, and numeral 133 indicates a permanent magnet rigidly provided in the holder guide 132. The thickness error signal 119 of the light transmission layer is fed back to the coil 131 by way of the second control circuit 125, and, by the electromagnetic action of the coil 131 and the permanent magnet 133, the lens holder 130 is driven in the direction of the arrow P in FIG. 10 along the optical axis of the collimator lens 103.

By moving the collimator lens 103 in the optical axis direction, it is possible to adjust the spherical aberration, and, in the condition in which the semiconductor laser 101 is arranged at the focal position of the collimator lens 103, the laser beam 102 transmitted through the collimator lens 103 becomes parallel rays, and no spherical aberration is generated since the parallel rays impinge upon the objective lens 105. However, when in the above condition the collimator lens 103 is moved in the optical axis direction of the laser beam 102, the laser beam 102 transmitted through the collimator lens 103 ceases to be parallel rays.

Thus, a beam which is not parallel rays impinges upon the objective lens 105, so that spherical aberration is generated. This spherical aberration has a polarity, and, assuming that it is positive polarity when the distance between the semiconductor lens 101 and the collimator lens 103 is smaller than the focal distance of the collimator lens 103, it is negative polarity when the above distance is larger than the focal distance. Utilizing this nature, the magnitude and polarity of the spherical aberration generated in the light spot condensed on the medium surface 106a of the information recording medium 106 are detected from the thickness error signal 119 of the light transmission layer, and the distance between the semiconductor laser 101 and the collimator lens is varied so as to generate a spherical aberration of the opposite polarity. The magnitude and polarity of the spherical aberration can be obtained from the inside of the thickness error signal 119 of the light transmission layer shown in FIG. 6, the S-shaped curve on the left-hand side, that is, the S-shaped curve on the focal point error signal 118 due to the reflection light 107b. It is possible to vary the sign of the spherical aberration between the case in which the collimator lens 103 is brought close to the semiconductor laser 101 and the case in which it is taken away from it, so that the collimator lens 103 is moved in a desired direction in correspondence with the sign of the light transmission layer thickness error signal.

Second Embodiment

Figure 11:
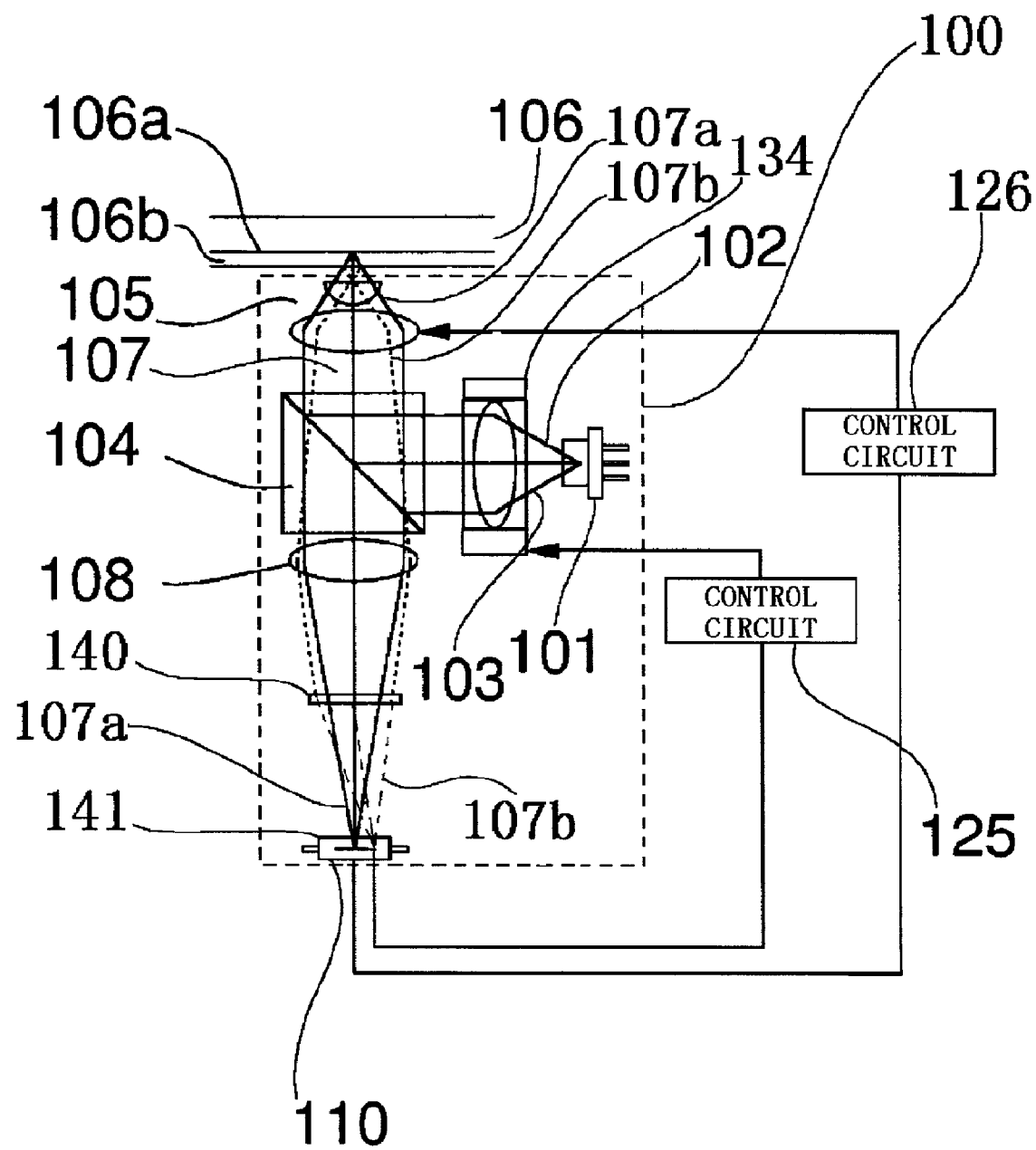
FIG. 11 is a schematic sectional view of an optical head device of a recording and/or playback apparatus according to the second embodiment of the present invention and a peripheral construction thereof.
Figure 12:
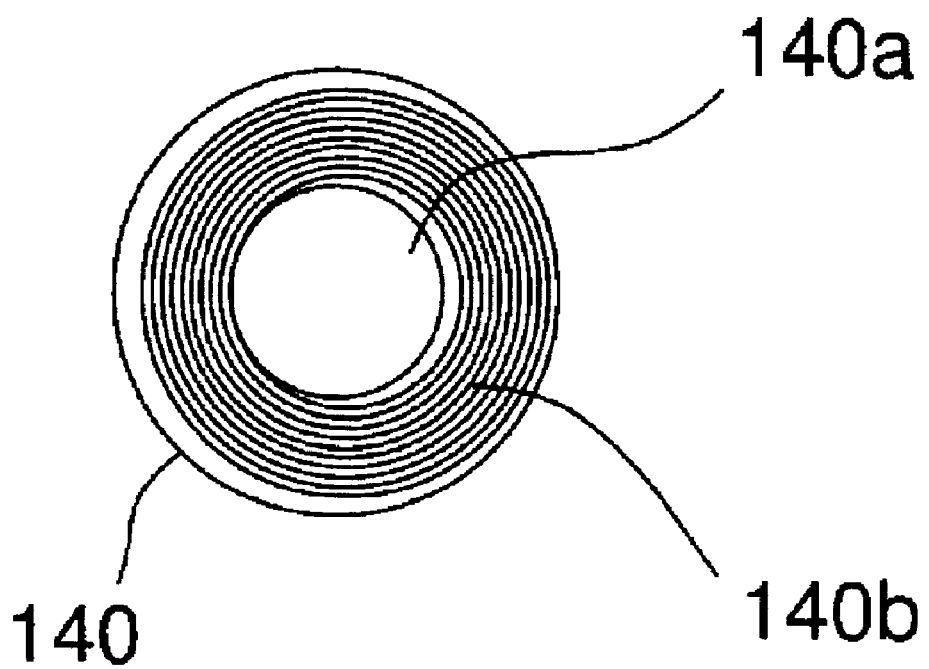
FIG. 12 is an enlarged view of the division convergence element of the second embodiment.
Figure 13:
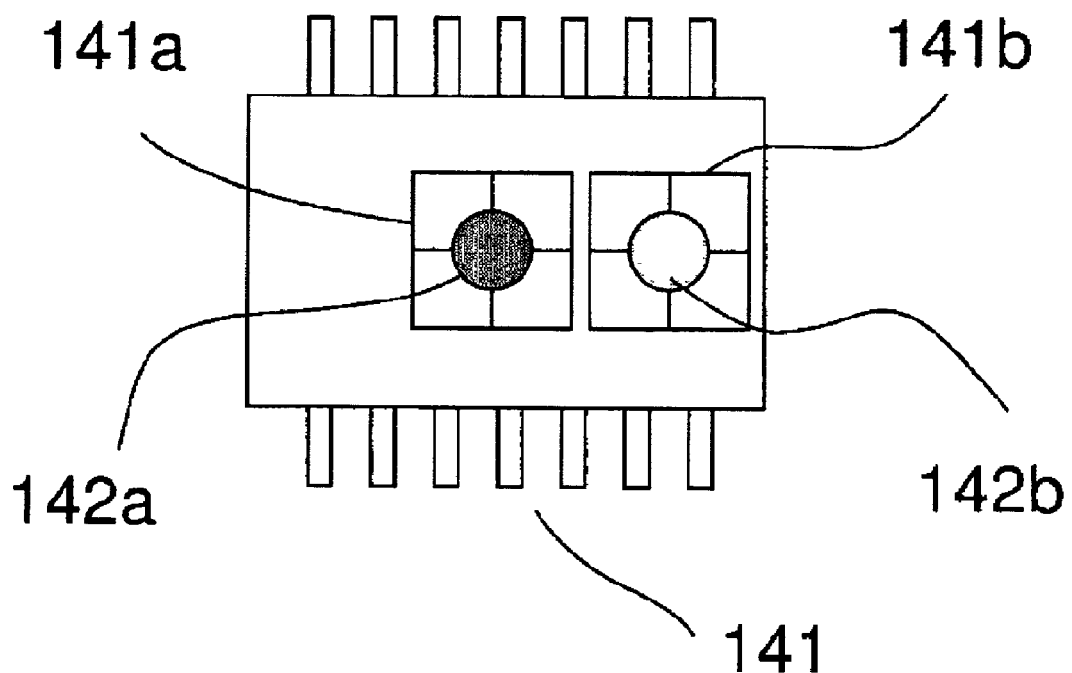
FIG. 13 is a diagram showing the condition of the convergent light on the photo detector of the second embodiment.
Figure 14:
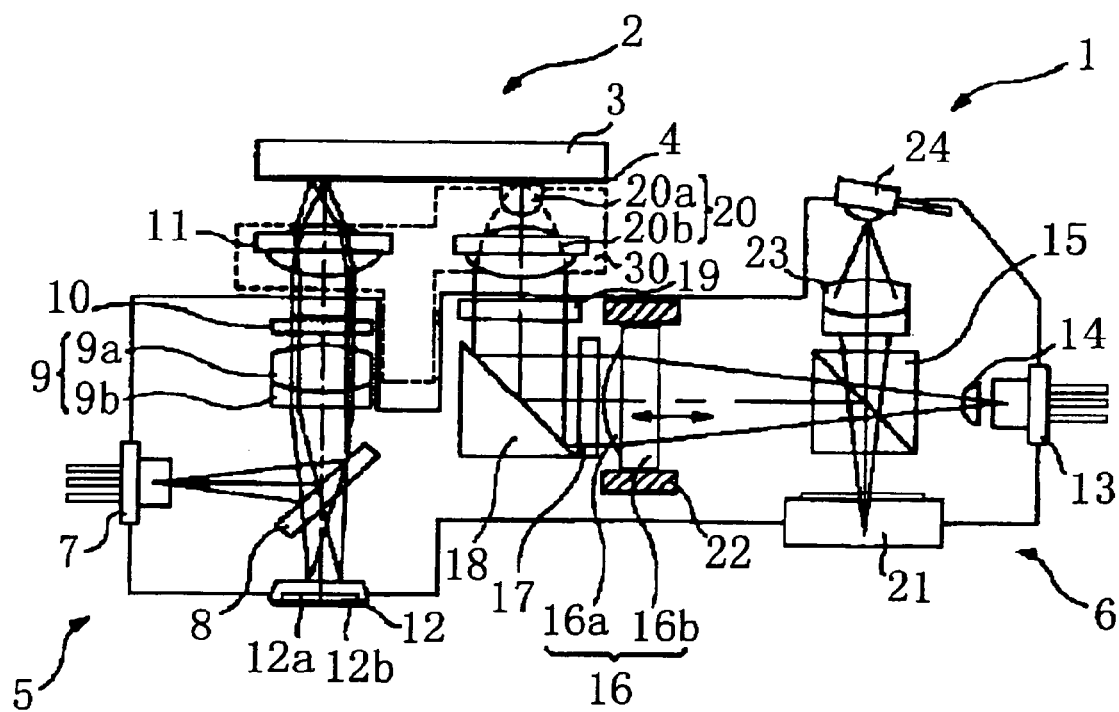
FIG. 14 is a diagram showing the construction of a conventional optical head device.

FIG. 11 is a schematic diagram showing an optical head device in a recording and/or playback apparatus according to the second embodiment of the present invention and the peripheral construction thereof. FIG. 12 is a plan view of a hologram element which is a means for dividing the reflection light 107 in this embodiment and in which there is a difference in refractive action between the inner peripheral portion and the outer peripheral portion. FIG. 13 is an enlarged view of a photo detector in this embodiment.

In FIGS. 11 through 13, the components which have the same functions as those of the first embodiment are indicated by the same reference numerals. In the drawings, numeral 140 indicates a hologram element which is adapted to cause the reflection lights 107a and 107b to converge on the photo detector 141 and in which there is a difference in refractive force between the inner peripheral portion 140a and the outer peripheral portion 140b, numerals 141a and 141b indicate the photo detector patterns on the photo detector 141, and numerals 142a and 142b indicate the condensing spots on the photo detector patterns 141a and 141b.

There is no refractive action in the inner peripheral portion 140a of the hologram element 140, and the reflection light 107a is caused to condense as it is on the photo detector pattern 141a as the condensing spot 142a. On the other hand, the outer peripheral portion 140b of the hologram element 140 causes the outer peripheral portion of the reflection light 107b to condense on the photo detector pattern 141b as the condensing spot 142b. From the condensing spot 142a received by the photo detector pattern 141a, the photo detector 141 outputs the focal error signal of the medium surface 106a, the tracking error signal, the playback signal, etc. On the basis of the focal error signal and the tracking error signal, the position of the objective lens 105 is controlled. On the other hand, from the converging spot 142b received by the photo detector pattern 141b, the thickness error signal of the light transmission layer 106b is output. As described with reference to FIG. 10 regarding the first embodiment, the position of the collimator lens 103 is controlled by way of the control circuit 125 on the basis of the thickness error signal, correcting the spherical aberration of the recording/playback light.

This embodiment, constructed as described above, provides the following effects.

The first reflection light reflected by the medium surface is received to detect the focal error with respect to the medium surface, and the second reflection light reflected by the surface of the light transmission layer is received to detect the focal error with respect to the surface of the light transmission layer, whereby the thickness of the light transmission layer in the same optical axis is detected, making it possible to accurately correct the spherical aberration.

Further, by arranging the shielding means at the focal position of the first reflection light, it is possible to restrain the reduction in the signal output at the time of reducing noise.

Further, the first reflection light and the second reflection light converged are respectively divided into the first detection means and the second detection means, whereby it is possible to easily conduct the first detection and the second detection.

Further, by using the hologram element, it is possible to simplify the optical system.

Further, by using the first detection means for the recording and/or playback of information on and/or from the information recording medium, it is possible to detect the thickness of the portion of the light transmission layer where the recording/playback is being conducted, thereby improving the accuracy in the recording and playback.

Further, the light receiving means of the first detection means is arranged at a position of the reference medium surface where the first reflection light converges, and the light receiving means of the second detection means is arranged at a position of the reference surface of the light transmission layer where the second reflection light converges, whereby if a different information recording medium is used, it can be flexibly coped with.

Further, the first reflection light is cut off between the division means and the second detection means, so that the noise of the error signal is reduced.

Further, the light receiving element of the first detection means and the light receiving element of the second detection means are integrated, whereby it is possible to achieve an improvement in the accuracy of the optical system through reduction in the number of component elements.

Further, by the correction means for correcting the spherical aberration, it is possible to achieve an improvement in terms of detection accuracy.

Further, there are provided a first control means which detects the focal error of the medium surface through the detection of the first detection means to control the position of the objective lens, and a second control means which detects the focal error of the surface of the light transmission layer by the second detection means and controls the moving means to correct the spherical aberration by the collimator lens, whereby it is possible to perform high-density recording/playback.

Further, there are provided a first detection step for detecting the focal error of the first reflection light, a step for moving the objective lens so as to correct the focal error of the first reflection light, a second detection step for detecting the focal error of the second reflection light, and a step for moving the collimator lens by the moving means so as to correct the spherical aberration in correspondence with the output of the second detection step, whereby it is possible conduct high-density recording/playback.

What is claimed is:

1. An optical head device comprising:
    a light source;
    a collimator lens for converting light emitted from the light source into parallel rays;
    a first objective lens which condenses the parallel rays on a medium surface of an information recording medium and which puts together a first reflection light obtained by reflecting the condensed light at the medium surface and a second reflection light obtained by reflecting the condensed light at the surface of a light transmission layer formed on the medium surface;
    a converging lens for converging the first reflection light and the second reflection light;
    a first detector receiving the first reflection light converged to detect a first focal error with respect to the medium surface;
    a second detector receiving the second reflection light converged to detect a second focal error with respect to the surface of the light transmission layer; and
    a moving unit moving the collimator lens in correspondence with the detection by the second detector.

2. An optical head device according to claim 1, wherein the first detector is used for the recording and/or playback of information on and/from the information recording medium.

3. An optical head device according to claim 1, further comprising a divider for dividing the first and second converged reflection lights respectively into the first and second detector.

4. An optical head device according to claim 3, wherein there is provided between the divider and the second detector a optical filter for shielding the first reflection light.

5. An optical head device according to claim 4, wherein the optical filter is arranged at the focal position of the first reflection light.

6. An optical head device according to claim 3, wherein there is provided at least either between the divider and the first detector or between the divider and the second detector a corrector for correcting spherical aberration.

7. An optical head device according to claim 1, wherein a photo detector of the first detector is integrated with a photo detector of the second detector.

8. An optical head device according to claim 7, wherein the photo detector of the first detector is integrated with the photo detector of the second detector.

9. An optical head device according to claim 1,
    wherein a light receiver of the first detector is arranged at a position where the first reflection light converges, and
    wherein a light receiver of the second detector is arranged at a position where the second reflection light converges.

10. A recording and/or playback apparatus comprising:
    an optical head device comprising a light source, a collimator lens for converting light emitted from the light source into parallel rays, a first objective lens which condenses the parallel rays on a medium surface of an information recording medium and which puts together a first reflection light obtained by reflecting the condensed light at the medium surface and a second reflection light obtained by reflecting the condensed light at the surface of a light transmission layer formed on the medium surface;
    a converging lens for converging the first reflection light and the second reflection light;
    a first detector receiving the first reflection light converged to detect a first focal error with respect to the medium surface;
    a second detector receiving the second reflection light converged to detect a second focal error with respect to the surface of the light transmission layer;
    a moving unit moving the collimator lens in correspondence with the detection by the second detector;
    a first control unit detecting the first focal error of the medium surface by the detection of the first detector to control the position of the objective lens; and
    a second control unit detecting the second focal error with respect to the surface of the light transmission layer and controlling the moving unit to correct the spherical aberration by the collimator lens.

11. A recording and/or playback method for a recording and/or playback apparatus said method comprising the steps of:
    detecting a first focal error of a first reflection light, the first reflection light being light from a light source that is reflected by a medium surface of an information recording medium;
    moving an objective lens so as to correct the first focal error of the first reflection light;
    detecting the focal error of a second reflection light, the second reflection light being the light from the light source that is reflected by a surface of a light transmission layer that is formed on the medium surface of the information recording medium; and moving a collimator lens by a moving unit so as to correct spherical aberration in correspondence with the output of the detection of the second reflection light.

12. An optical head system comprising:
    a light source for emitting light, the emitted light being directed towards a medium surface of an information recording medium and towards a surface of a light transmission layer that is formed on the medium surface of the information recording medium;

a first detection unit for receiving a first reflected light, the first reflected light being the emitted light that is reflected from the medium surface of the information recording medium;

a second detection unit for receiving a second reflected light, the second reflected light being the emitted light that is reflected from the surface of the light transmission layer, wherein a first focal error is determined on the basis of the first reflected light, and wherein a second focal error is determined on the basis of the second reflected light.

13. The optical head system according to claim 12, wherein the first focal error is a tracking error signal and/or a playback signal.

14. The optical head system according to claim 12, wherein the second focal error is a thickness error of the light transmission layer.

15. The optical head system according to claim 12, wherein an objective lens is adjusted on the basis of the first focal error, the objective lens condensing the emitted light from the light source onto the medium surface and onto the surface of the light transmission layer.

16. The optical head system according to claim 12, wherein a collimator lens is adjusted on the basis of the second focal error, the collimator lens converting the emitted light from the light source into parallel light rays.

17. The optical head system according to claim 16, wherein the collimator lens is provided between, with respect to a light path, the light source and an objective lens.

* * * * *